J. G. SCOTT.
COMBINATION WATER HEATER.
APPLICATION FILED JULY 29, 1915.
1,220,695.
Patented Mar. 27, 1917.
3 SHEETS—SHEET 3.
Fig. 3.
Fig. 4.
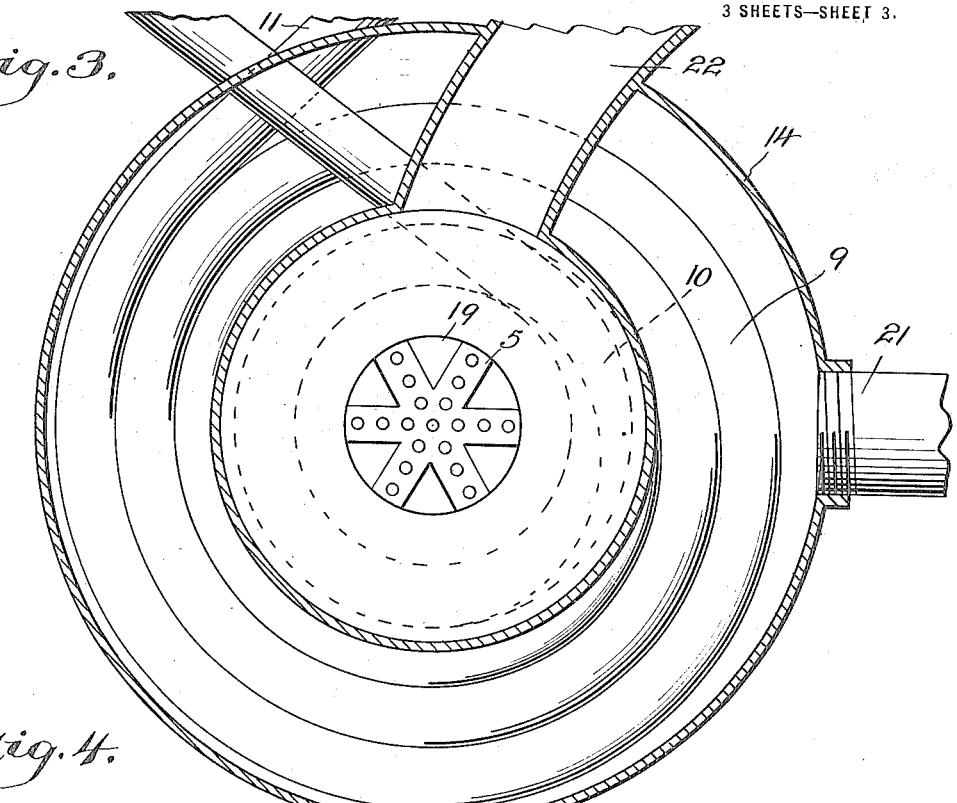
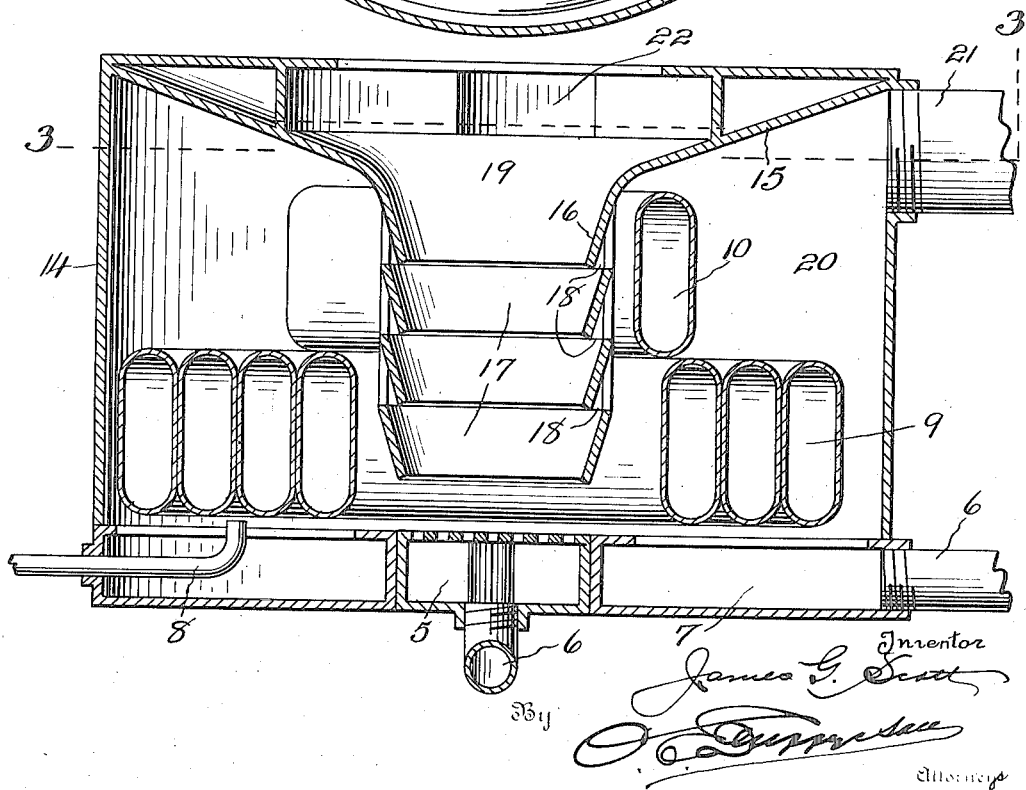

UNITED STATES PATENT OFFICE.

JAMES G. SCOTT, OF WASHINGTON, DISTRICT OF COLUMBIA.

COMBINATION WATER-HEATER.

1,220,695.  Specification of Letters Patent.  Patented Mar. 27, 1917.

Application filed July 29, 1915. Serial No. 42,520.

*To all whom it may concern:*

Be it known that I, JAMES G. SCOTT, a citizen of the United States, residing at Washington, in the District of Columbia, have invented certain new and useful Improvements in Combination Water-Heaters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to domestic heating systems and has for its object to provide a combined gas cooking stove, water heater and oven, the same being so constructed and arranged that the same burner or burners utilized for the cooking stove will simultaneously heat water to be stored in a boiler or tank, and will simultaneously heat an oven for baking and the like.

A further object of the invention is to provide simple and effective means and instrumentalities for heating water from the burner of the cook stove and leading heat therefrom to an oven for baking purposes.

With these and other objects in view the invention consists in the novel construction and arrangement of the heater and in certain combinations of parts, all of which will be first fully described and afterward specifically pointed out in the appended claim.

Referring to the accompanying drawing—

Fig. 3 is a horizontal sectional view of one of the heaters taken on line 3—3 of Fig. 4.

Fig. 4 is a vertical sectional view through one of the burners and heaters, and

Fig. 5 is a fragmentary perspective view of the oven damper.

Like numerals of reference indicate the same parts throughout the several figures, in which—

Figure 2:
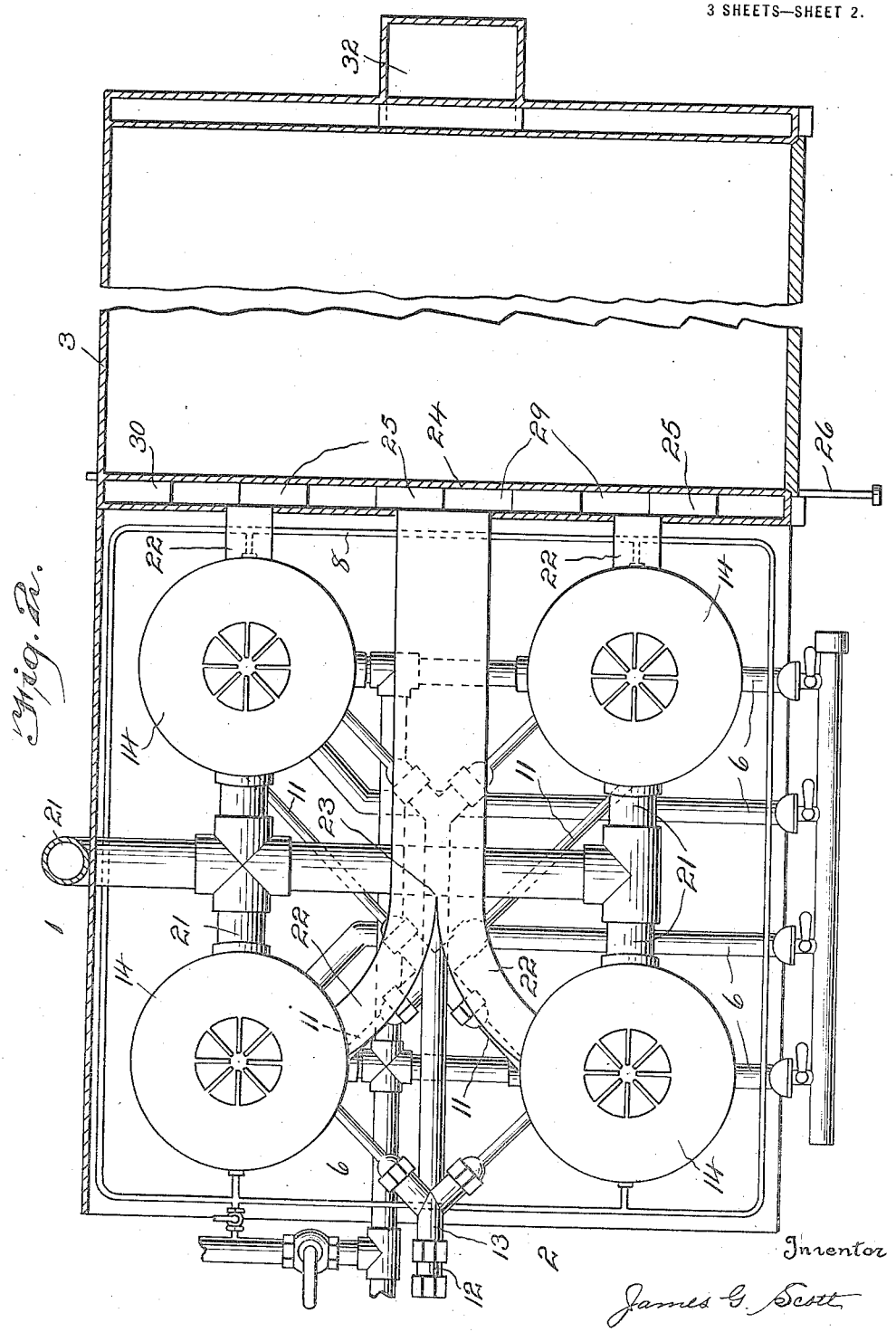
Fig. 2 is a top plan view of the heater, the oven being shown in horizontal section.

1 indicates the device which includes the gas cook stove 2, oven 3 and hot water tank or boiler 4, the cook stove 2 comprising a plurality of burners 5 to which the fuel gas is piped at 6, in the manner as shown in Fig. 2.

Referring now to Fig. 4 it will be seen that a large burner 7 surrounds the central service burner 5, which large burner 7 is fed independently of the service burner 5, both of the gas feed pipes to said burner being indicated by the numeral 6. It will also be seen that a pilot burner 8 is provided for said large burner 7, which large burner 7 is disposed directly under the hot water coil 9, which it will be seen is provided with a single superimposed coil 10, said hot water coil being piped at 11 to the water supply pipe 12 and to the boiler feed pipe 13.

A housing 14 is provided for each burner, and within said housing and positioned as shown in Fig. 4 is an annular dished member 15 provided with a central open depending portion 16 comprising a series of hollow frusto-conical members 17 in close association with one another and providing an opening 18 between each member 17, said arrangement of sections extending down within the coil 9 and superimposed coil section 10, and into close proximity with the service burner 5. Said annular dished member 15 and its frusto-conical depending sections 17 dividing the space inclosed by the casing 14 into two compartments, the central one being indicated by the numeral 19 while the outer surrounding compartment is indicated by the numeral 20, it being understood that the hot water coils are all positioned within the outer surrounding compartment 20. 21 indicates a flue pipe connecting said compartment 20 with the outside atmosphere or a smoke pipe, chimney or the like, while the central compartment 19 has connected therewith a flue 22, which in a multiple burner stove as shown in Fig. 2 may be breasted at 23 for two or more of the burners or the flues 22 may lead directly to the damper chamber 24 of the oven 3.

Figure 1:
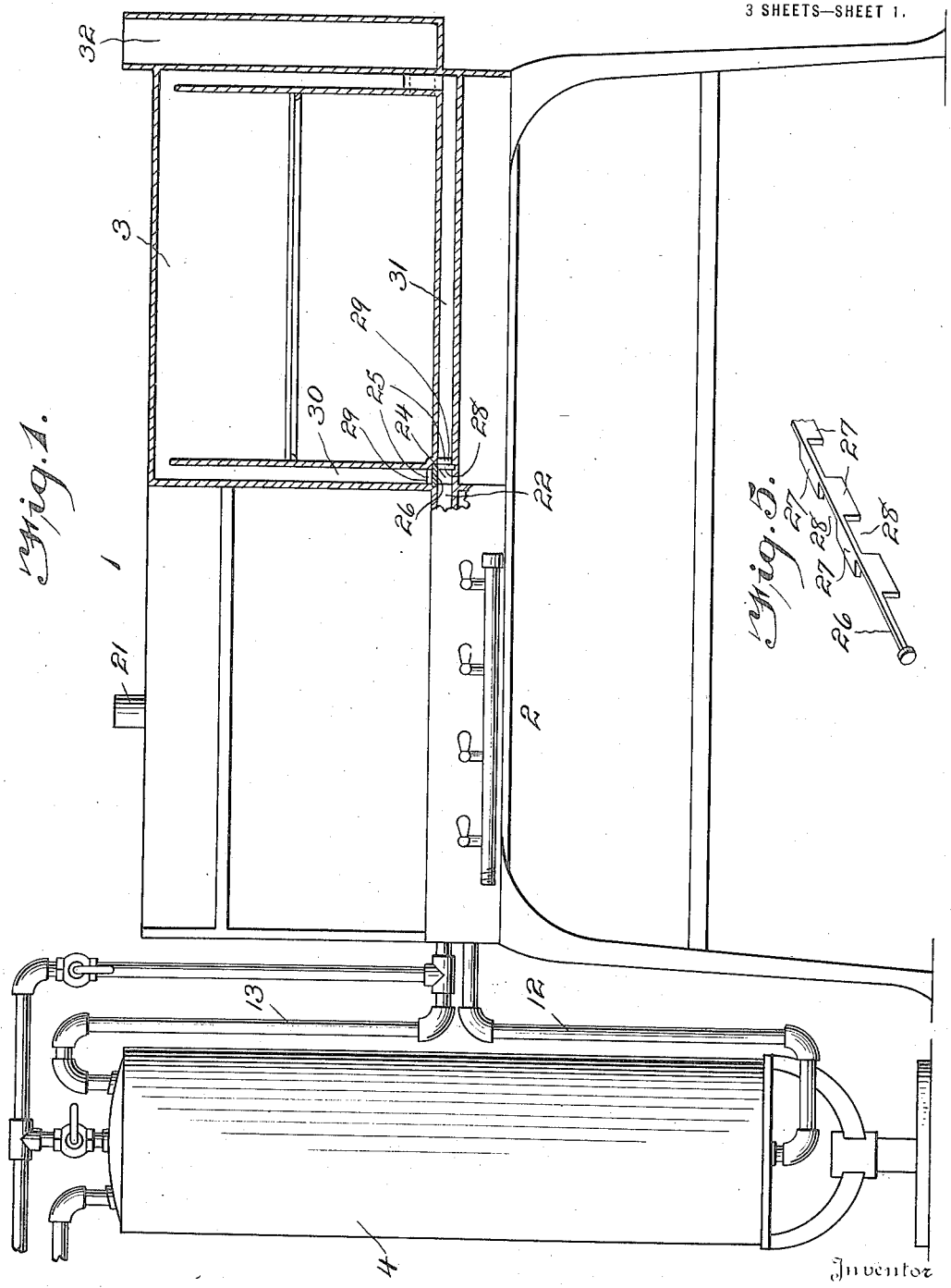
Figure 1 is an elevation of a heater constructed in accordance with this invention, the oven being shown in section.

The damper chamber 24 is provided vertically and horizontally with permanent partitions 25, as shown in Fig. 1. The damper 26 (Fig. 5) is provided with partitions 27 spaced apart by staggered openings 28, the partitions 27 of the damper being arranged in two series disposed at right angles to each other, so that upon sliding movement of the damper 26 the partitions 27 thereon can register with the openings 29 between the horizontal or vertical partitions 25 in the damper chamber 24 so as to close or open either the vertical heat flue 30 or the lower horizontal heat flue 31 of the oven 3, so that the heat passing to the oven from the burner flues 22 can be directed either under the oven through the flue 31 and thence to the top of the oven through said flue or the heat can be initially directed to the top of the oven through the flue 30. Connected to said oven is a draft pipe 32 of suitable proportions to allow for a steady draft of heat from the stove burners to the oven.

Having thus fully described the several parts of this invention it is to be understood that the construction of the casing 14 and the arrangement of the outer chamber 20 and the depending frusto-conical sections 17 of the annular dished member 15 is to provide for the escape of the noxious carbon monoxid gas generated by the hot water coil or heater through the flue 21, which construction forms the subject matter of contemporaneous applications, Serial No. 864473, filed October 1, 1914 and Serial No. 42519, filed July 29, 1915.

In operation the heat from the service burner 5 is directed upwardly through the depending frusto-conical sections 17 and through the chamber 19 for cooking purposes, the available heat entering the flue 22 and passing to the oven 3 as heretofore described, while the frusto-conical formation of the sections 17 provide for the passage of heat from the service burner 5 to the hot water coils so that said coils are at all times heated to provide available hot water in the boiler or tank 4. For instantaneous heating of the water however, the outer burner 7 is available to quickly heat the coils, which it will be understood can be accomplished either independently of or in connection with the service burner 5.

By means of this construction and arrangement of heating system I am enabled to utilize the service burners for a threefold purpose. First, to cook over the said burner, secondly, to heat water to be stored in a tank or boiler and thirdly, to heat an oven for baking purposes, and it will be understood that all of this is accomplished in a safe and reliable manner by providing an effective arrangement for carrying off and disseminating in the outside atmosphere the noxious carbon monoxid gas generated by reason of contact of the flame of the burner with the cooler surfaces of the hot water coil.

Having thus fully described the invention, what I claim as new and desire to secure by Letters Patent of the United States is—

A device of the character described, including a casing, means for partitioning the casing into an outer and an inner compartment communicating with each other, a water receptacle within the outer compartment, a burner under said water receptacle, the said partitioning means being provided with a depending portion extending over and within said water receptacle, a flue entering the outer compartment to lead gases from said burner from the said casing, a flue entering the inner compartment and an oven in communication with said last mentioned flue to receive heat therefrom, substantially as described.

In testimony whereof, I affix my signature, in presence of two witnesses.

JAMES G. SCOTT.

Witnesses:
C. HUGH DUFFY,
REID STANTON.